United States Patent [19]

Bergmans et al.

[11] 4,306,261
[45] Dec. 15, 1981

[54] METHOD AND APPARATUS FOR RECORDING HELICAL SCAN INFORMATION AND TRACKING SIGNALS

[75] Inventors: Hendrik J. Bergmans; Hendrik J. Sanderson, both of Eindhoven, Netherlands

[73] Assignee: U.S. Philips Corporation, New York, N.Y.

[21] Appl. No.: 83,719

[22] Filed: Oct. 11, 1979

[30] Foreign Application Priority Data

Oct. 12, 1978 [NL] Netherlands ......................... 7810250

[51] Int. Cl.³ ...................... G11B 21/10; G11B 21/24
[52] U.S. Cl. ...................................... 360/109; 360/70; 360/77; 360/84
[58] Field of Search ...................... 360/77, 70, 84–85, 360/104–105, 109

[56] References Cited

U.S. PATENT DOCUMENTS

| | | | |
|---|---|---|---|
| 3,838,453 | 9/1974 | Buscik et al. | 360/77 X |
| 4,044,388 | 8/1977 | Metzger | 360/84 X |
| 4,071,856 | 1/1978 | Kihara et al. | 360/70 X |
| 4,120,008 | 10/1978 | Metzger et al. | 360/84 X |
| 4,141,047 | 2/1979 | Kambara et al. | 360/109 X |

Primary Examiner—John H. Wolff
Attorney, Agent, or Firm—David R. Treacy

[57] ABSTRACT

A method of recording information on a tape-like record carrier by means of a device provided with a rotary head disc on which a write head with controllable height is mounted for actively following the tracks. During recording tracking signals are written with the aid of a separate fixed head, which preferably also constitutes the erase head, and the write head follows the tracking signal recorded by the fixed head during the recording of information.

9 Claims, 9 Drawing Figures

| I | II | III | IV | V | VI | VII |
|---|---|---|---|---|---|---|
| n−1 | f4 | 3 | f2 | 152 kHz | 47 kHz | 15 kHz |
| n | f1 | 2 | f1 | 104 kHz | 47 kHz | 15 kHz |
| n+1 | f2 | 3 | f4 | 119 kHz | 47 kHz | 15 kHz |
| n+2 | f3 | 2 | f3 | 167 kHz | 47 kHz | 15 kHz |
| n+3 | f4 | 3 | f2 | 152 kHz | 47 kHz | 15 kHz |
| n+4 | f1 | 2 | f1 | 104 kHz | 47 kHz | 15 kHz |

METHOD AND APPARATUS FOR RECORDING HELICAL SCAN INFORMATION AND TRACKING SIGNALS

BACKGROUND OF THE INVENTION

The invention relates to a method of recording information and tracking signals on a tape-like record carrier in the form of tracks which are substantially parallel to each other and which make an angle with the longitudinal axis of the record carrier by means of an apparatus which comprises a rotary head disc on which there is arranged at least one first write head, which is controllable in respect of height, the height of said first write head being controlled as a function of the strength of the tracking signals read by said write head.

Such a method is known from Netherlands Patent Application No. 7702815 laid open on Sept. 19, 1978 to which co-pending U.S. application Ser. No. 136,235, assigned to the assignee of the instant application, corresponds. In accordance with this method the write head simultaneously writes tracking signals and information, the write head being centered on a track during read out by reading the tracking signals produced by cross-talk from the two adjacent tracks and comparing the amplitudes of these cross-talk signals. Said application also describes a kind of tracking during recording. In this case the head which records a specific track reads the tracking signal produced by cross-talk from the preceding track and the head is controlled so as to remain at a substantially constant distance from said preceding track as a function of said cross-talk tracking signal, so that substantially equidistant tracks are written.

This method of having the write head follow a specific track during recording by reading tracking signals written in the preceding track by said write head is found to be unsatisfactory, because the cross-talk tracking signals being read are very weak relative to the write current required for recording the information and can hardly be discriminated from the noise by which said write current is accompanied.

SUMMARY OF THE INVENTION

It is an object of the invention to provide a recording method which does not have this drawback. To this end the invention is characterized in that the tracking signals are recorded by at least one fixed write head and that during the recording of information by the first write head the tracking signals recorded by the fixed write head are read by the first write head.

As the tracking signals are written by a separate head the tracking signals can be recorded with much greater strength than with the head by which the information is recorded, because the maximum strength of the tracking signals to be recorded is then not limited as a result of cross-modulation with the information to be recorded, as would be the case with the known method. Moreover, this had the advantage that in the case of tracking during reproducing also stronger tracking signals are available. An additional advantage is that with the second write head the tracking signals can be recorded in such a way that during writing the first write head may be controlled in the same way as during recording, namely by comparison of the strength of tracking signals produced by cross-talk from the two adjacent tracks instead of by measuring the amplitude of one adjacent track only, as is the case with the known method.

When the method in accordance with the invention is employed for recording with a plurality of heads which consecutively write a track, an additional advantage is that the mutual distance of the tracks can be maintained constant in a more accurate manner than is the case with the known method. Indeed, if the known method is used in the case of a plurality of heads, which are all mounted so as to be controllable, the mutual track distance is determined by the height of the heads relative to each other, which height is inaccurate because the two heads are mounted in such a way that they are controllable in height. Recording tracking signals with at least one fixed head ensures a very high constancy of the mutual distance of the tracks defined by these recorded tracking signals, which tracks are followed by the write heads.

The method in accordance with the invention may further be characterized in that during the recording of tracking signals by the fixed write head also an erase signal is applied to that fixed write head for erasing any information contained on the tape.

Thus, the additional head required for the method in accordance with the invention is combined with the erase head which is needed anyway. The bias signal of the fixed write head is then used as erase signal.

The invention also relates to an apparatus for carrying out the inventive method, comprising a head disc and at least a first write head mounted on the disc. The first head is controllable in height relative to the plane of rotation of the head disc, for recording information on a tape-like record carrier in the form of tracks which are substantially parallel to each other and which make an angle with the longitudinal axis of said tape-like record carrier.

In a preferred embodiment of this apparatus a fixed write head is mounted on the head disc and means tracking signals to be recorded are applied to the fixed write head.

Advantageously, the apparatus includes means for applying erase signals to said fixed head for erasing any information contained on the tape.

An apparatus in accordance with the invention in which the head disc in addition to the first write head which is controllable in height, is provided with a second write head which is controllable in height and which is diametrically opposed to the first write head, is further characterized in that the fixed head is provided with two magnetic circuits, each having a write gap for simultaneously recording tracking signals in two adjacent tracks.

In an apparatus comprising two write heads which each cooperate with the tape during half a revolution of the head disc in that the tape is passed around a drum, in which the head disc rotates, in accordance with a helical path over 180°, the use of one head for recording the tracking signals is more advantageous than recording with two heads because in that case the track distance is always determined by the one head, while if two separate heads are used the mutual height must be adjusted accurately.

In respect of a fixed head with two gaps it is advantageous that the two gaps viewed in the direction of rotation of the head disc are disposed after each other, the trailing gap having a width which is smaller than the leading gap by an amount equal to the track width, the width of the gaps being at least a plurality of times the track width.

With this arrangement a first tracking signal is recorded on a wide track by the leading gap, and the trailing gap erases a part of this signal and records a second tracking signal over it. The first tracking signal is maintained over a width equal to the desired track width. This has the advantage that erasing by this head is very effective because each existing track is erased several times.

In order to prevent cross-talk between the comparatively strong tracking signals applied to the fixed write head, and the first and second write heads with which comparatively weak tracking signals are read, it is advantageous that, viewed in the direction of rotation of the head disc, the fixed write head is disposed substantially halfway between the first and second write heads which are controllable in height, the height control of the first or the second write head as a function of the tracking signals read by that write head being interrupted for half the revolution period in which the fixed head records tracking signals.

As a result of this step the tracking for each of the first and the second write heads is operative only for half of each write period, which in practice is found to be satisfactory for recording information. During reproduction tracking remains possible for the entire period.

BRIEF DESCRIPTION OF THE DRAWINGS

The invention will now be described in more detail with reference to the drawing, in which FIG. 1 schematically represents the principle of a helical scan apparatus in accordance with the invention.

DESCRIPTION OF THE PREFERRED EMBODIMENTS

Figure 1:
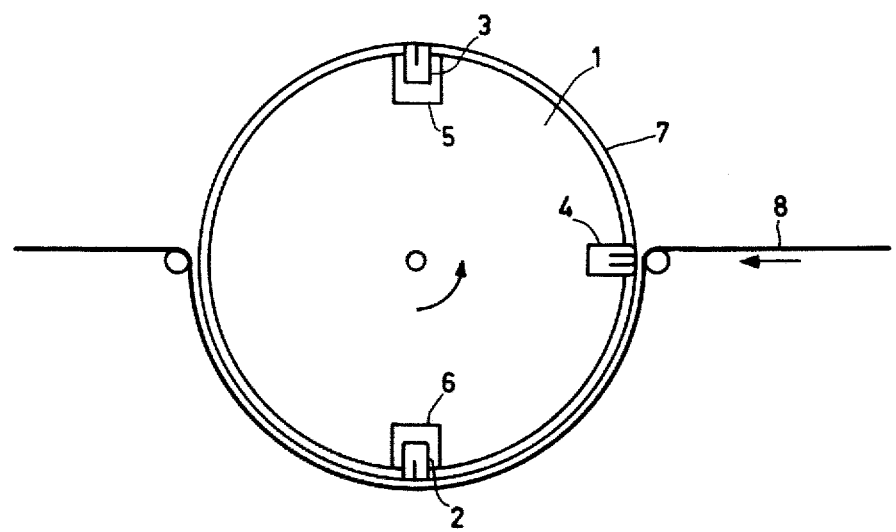

FIG. 1 schematically represents the principle of a helical scan recorder comprising two recording/reproducing heads for carrying out the method in accordance with the invention. This recorder comprises a rotary head disc 1 with two diametrically opposed recording-/reproducing heads 2 and 3 disposed on it, which are mounted on a transducer 5 and 6 respectively. The head disc 1 rotates inside a drum 7 around which a magnetic tape 8 is passed in accordance with a helical path over half the circumference. The heads can make magnetic contact with the tape 8 through a slot in the drum 7.

The head disc 1 is furthermore provided with a head 4 having a double gap. In the present example this head 4 is disposed at an angle of 90° relative to the heads 2 and 3.

As the tape 8 is passed around a drum 7 in accordance with a helical path, the heads 2 and 3 alternately record oblique tracks on the tape 8. In order to ensure that the heads 2 and 3 correctly follow the tracks on the tape 8 these heads are mounted on transducers 5 and 6 respectively, by means of which transducers the height of the heads 2 and 3 can be controlled under command of control signals. Preferably piezo-electric elements are used for these transducers. The head 4 is fixed and not controllable, at least in respect of tracking. By means of the fixed head 4 tracking signals can be recorded on the tape 8, which tracking signals define tracks which can be followed by the heads 2 and 3 by applying control signals to the transducers 5 and 6.

By the use of a separate head for recording the tracking signals the signals can be recorded with a greater amplitude than is the case with the known method, the tracking signals being recorded by the write heads 2 and 3 simultaneously with the signal, so that allowance is to be made for cross-modulation between the signal and the tracking signals. The use of a separate fixed head or heads furthermore ensures that the tracking signals are recorded at mutually constant distances and more rectilinearly than with write heads which are mounted so as to be movable in height for the purpose of tracking during reproduction.

The example shown in FIG. 1 relates to a two-head recorder, the tape being passed around the drum through 180°. Thus, per revolution of the head disc 1 one track is recorded by each of the heads 2 and 3. For recording the tracking signals it is then possible to use two diametrically opposed fixed heads, which per revolution of the head disc 1 record one track each. If, as in the present example, one fixed head is used, this head should record tracking signals in two tracks at a time. As the tracking signals in adjacent tracks should be distinguishable from each other, for example in respect of frequency, such a fixed head should then have two head gaps, which has the additional advantage that the distance between the two tracks recorded per revolution is defined by the construction of the head.

Figures 2A, 2B:
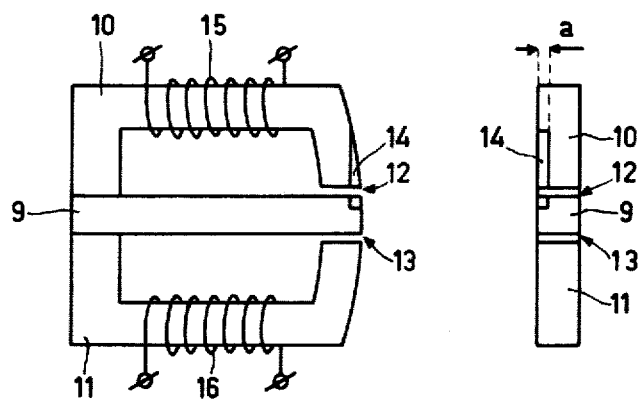
FIGS. 2A and 2B are diagrammatic elevations of the write head for recording tracking signals, as used in an embodiment of an apparatus in accordance with the invention.

The method in accordance with the invention is particularly advantageous when the fixed head by means of which the tracking signals are recorded is also used for erasing the tape. Erasing is then effected by means of the bias current of this head. A head which is particularly suitable for this purpose is diagrammatically shown in FIG. 2, FIG. 2A being a side view and FIG. 2B a view at the gap side of the head 4. The head comprises two magnetic circuits each with a section 10 and 11 respectively, and a common closing yoke 9 which forms gaps 12 and 13 with the sections 10 and 11 respectively. A coil 15 and 16 are respectively arranged around the sections 10 and 11. By forming a recess 14 the gap 12 is an amount a smaller than the width of the gap 13. The fields in the gaps 12 and 13 are defined independently of each other by energizing the coils 15 and 16.

Figure 3:
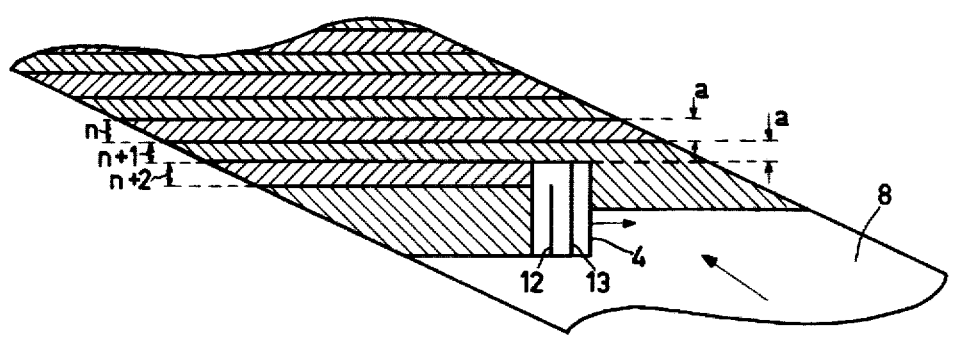
FIG. 3 shows a plan view of a tape-like record carrier on which the recorded tracking signals are schematically represented to illustrate the operation of the write head shown in FIGS. 2A and 2B, FIG. 4 schematically represents a first embodiment of a method in accordance with the invention, FIG. 5 schematically represents a preferred embodiment of the method in accordance with the invention.

FIG. 3 shows a plan view of a part of a tape 8, schematically showing a number of tracks defined by tracking signals and a head 4 with the gaps 12 and 13 which cooperate with the tape 8.

When the head 4 passes obliquely over the tape a first tracking signal is recorded on a broad track via the leading gap 13. The trailing gap 12 writes a narrower broad track over it with a second tracking signal and leaves the first tracking signal intact over a width a. Thus, the track n and the track n+2 etc. are obtained. The width a should be selected in such a way in relation to the tape speed and the head speed that in one revolution of the head disc 1 the head 4 is moved over a distance 2a relative to the tape in a direction perpendicular to the tracks. Thus the tape contains a track having a width a with the tracking signal recorded by the second gap 12 when the head 4 makes the next revolution. In this way the track n+1 is obtained.

The gaps 12 and 13 which are comparatively long relative to the track width a have the advantage that the information contained on the tape 8 can be erased very effectively because each existing track is erased several times by the head 4.

Figure 4:
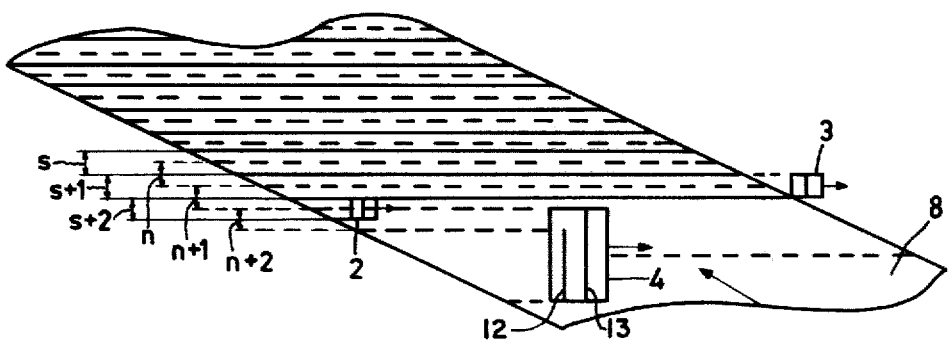

For recording the information by the heads 2 and 3 the same tracking methods may be used as during the reproduction of recorded information, because the tracking signals have been recorded prior to the recording of information by the head 4. FIG. 4 schematically shows a first possibility of realizing this.

On the tape 8 the tracks with tracking signals recorded by the head 4 are represented by dashed lines, for example the tracks n, n+1 and n+2. The tracking signals in these tracks are such, for example in respect of frequency, that the tracking system detects the signals read from two adjacent tracks by the write heads 2 and 3 and compares them in respect of amplitude. The heads 2 and 3 are controlled in height in such a way that they follow the boundary between two adjacent tracking signals, for example the head 2 follows the boundary between tracks n+1 and n+2 and writes an information track s+2 halfway over the track n+1 and halfway over the track n+2. During reproduction the same tracking method may be adopted. The advantage of this method is that the tracks to be followed are situated underneath the relevant write head, so that comparatively strong tracking signals are read. However it is a drawback that the two tracking signals to be read by the relevant head are recorded with separate bias currents by the individual gaps of the two-gap head 4, which may give rise to differences in the tracking accuracy. Furthermore, it is found that the steepness of the discrimination characteristic, which is obtained by plotting the difference in strength of the tracking signals read from adjacent tracks by a head versus the displacement of the head, is small. Therefore, it is found to be more advantageous if also during writing the tracking method employed for reproduction and known from Netherlands Patent Application No. 7702815 described above is used, in spite of the comparatively smaller strength of the tracking signals produced by cross-talk from the tracks on both sides of a track to be followed.

Figure 5:
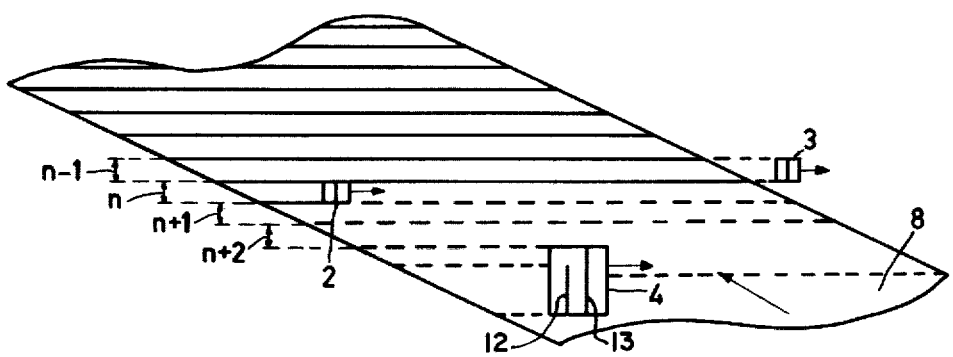

FIG. 5 schematically represents the principle of tracking used in a preferred embodiment of an apparatus for carrying out the method in accordance with the invention. On the tape 8 the head 4 writes tracks with tracking signals, for example the tracks n−1, n+1 and n+2, which tracks are followed by the heads 2 and 3 both when recording and when reproducing information by comparing the amplitudes of the tracking signals produced as a result of cross-talk from the two tracks adjacent the track to be followed. In the situation shown the head 2 follows the track n by reading the tracking signals produced by cross-talk from the tracks n−1 and n+1. In a similar way as in the tracking system in accordance with Netherlands Patent Application No. 7702815 use is made of tracking signals with frequencies which differ in every four consecutive tracks, in such a way that after mixing the sum of the tracking signals read with a mixing signal the mixing products of the mixing signal and the tracking signals from the tracks adjacent the track to be followed have a known frequency which can be distinguished from each other and from other mixing products. In the preferred system in accordance with that Application mixing products were produced of a first and a second frequency which for the one head corresponded to the preceding and the next track respectively and for the other head just the other way around. In the preferred embodiment of the invention a frequency sequence has been selected such that the mixing product of the tracking signal from a track preceding the track to be followed has a first specific frequency and the mixing product of the tracking signal from the track following the track to be followed has a second specific frequency.

Figures 6, 7:
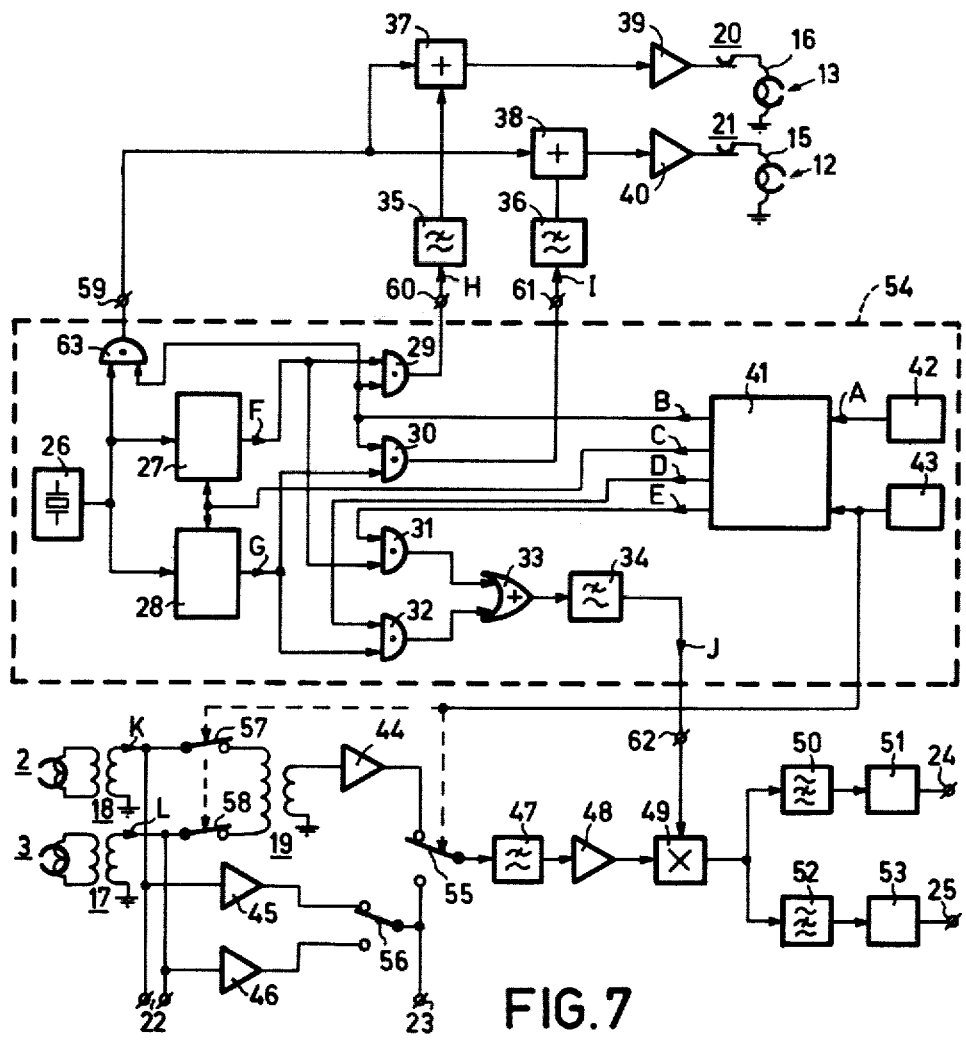
FIG. 6 is a table of frequencies of the tracking signals used in the preferred embodiment of FIG. 5, FIG. 7 schematically presents a preferred embodiment of an apparatus for carrying out the preferred variant of the method in accordance with the invention, and FIG. 8 schematically represents a number of signals to illustrate the operation of the apparatus in accordance with FIG. 7.

FIG. 6 is a table giving the frequencies selected for the tracking signals in the preferred embodiment. In this table column I gives a track indication which refers to FIG. 5, column II the frequency indication of the tracking signals recorded in those tracks, column III the reference number of the head which should follow this specific track, column IV the frequency indication of the mixing signal to be applied when the relevant track is followed, column V the values selected for these frequencies from column II, rounded to whole numbers of kHz, column VI the frequencies of the mixing product with the tracking signal from the preceding track, rounded to whole numbers of kHz, and column VII the values of the frequency of the mixing product with the tracking signal from the following track.

FIG. 7 shows a preferred embodiment of an apparatus for carrying out the method in accordance with the invention. This apparatus comprises a frequency generator 54, surrounded by dashed lines, which includes a program generator 41 for controlling the frequency sequence. The output signal of an oscillator 26 having a basic frequency of for example 5 MHz is applied to two frequency dividers 27 and 28 which are controlled by an output signal C from the program generator 41, for generating the frequencies $f_1$, $f_2$, $f_3$ and $f_4$. The output signals of these frequency dividers F and G are applied to outputs 60 and 61 on command of the output signal B from the program generator 41 via gates 29 and 30. The signals H and I on these outputs are the tracking signals to be recorded. Also on command of the output signals D and E of the program generator 41 the signals F and G are added with OR-gate 33 via gates 31 and 32 and applied to output 62 of the frequency generator 54 via a low-pass filter 34. The output signal J on said output 62 constitutes the mixing signal for tracking. The program generator 41 is controlled by a device 42 which, for example via a tachogenerator, produces one pulse per revolution of the head disc 1 and a device 43 which changes over the program generator when switching from recording to reproducing and vice versa.

The tracking signal H or I on output 60 or 61 respectively is applied to an adder 37 or 38 respectively via a low-pass filter 35 or 36 respectively to which adder the output signal of the oscillator 26 is also applied, which signal serves as erase signal. The output signal of the adder 37 or 38 is applied to the coil 16 or 15 of the head 4 via amplifier 39 or 40 respectively and for example the slip ring 20 or 21 respectively. Via rotary transformers 17 and 18 the heads 2 and 3 are connected to signal inputs 22 and via said rotary transformers, amplifiers 45 and 46 and switch 56 to a signal output 23. For processing the tracking signal K or L read by the head 2 or 3 respectively the secondary side of the rotary transformer 18 or 17 is connected to a contact of switch 57 or 58 respectively and via amplifier 45 or 46 and switch 56 to a connection of a switch 55. Between switches 57 and 58 the primary of a transformer 19 is included, whose secondary side is connected to a switch 55 via amplifier 44. Via a low-pass filter 47 and an amplifier 48 the master contact of switch 55 is connected to a mixing stage 49, to which the signal J on output 62 of the frequency generator is applied as mixing signal. The output signal of mixing stage 49 is connected to a first control signal output 24 via a band-pass filter 50 and an amplitude detector 51 and to a second control signal output 25 via a band-pass filter 52 and amplitude detector 53.

When recording information the information signal is applied to the two inputs 22 in phase and thus to the heads 2 and 3, one or the other of which is always in magnetic contact with the tape 8 and thus records the information. During recording the switches 57 and 58 are closed (position shown). The comparatively strong information signal to be recorded is hardly present across the primary of transformer 57 because this signal is applied to the two inputs 22. The tracking signals K and L being read, which do not appear simultaneously, are applied to the mixing stage 49 via transformer 19, ammplifier 44, switch 55, which during recording is in the position shown, filter 47 and amplifier 48. During reproduction the switches 57 and 58 are in the open position and switch 55 is in the position not shown. The tracking signals read are applied to the mixing stage 49 via amplifiers 45 and 46, switch 56, switch 55, filter 47 and amplifier 48. Switch 56 changes over two times per revolution of the head disc in such a way that each time the information signals being read by the heads 2 or 3, which ever makes contact with the tape 8, is applied to the information signal output 23. Both during recording and during reproducing the tracking signals K and L being read are applied to the mixing stage. The two desired mixing products (15 kHz and 47 kHz in the present example) are extracted with the band-pass filters 50 and 52 and their amplitudes are measured with the amplitude detectors 51 and 53 and produce control signals on the outputs 24 and 25, by means of which control signals the transducers 5 and 6 are controlled.

Figure 8:
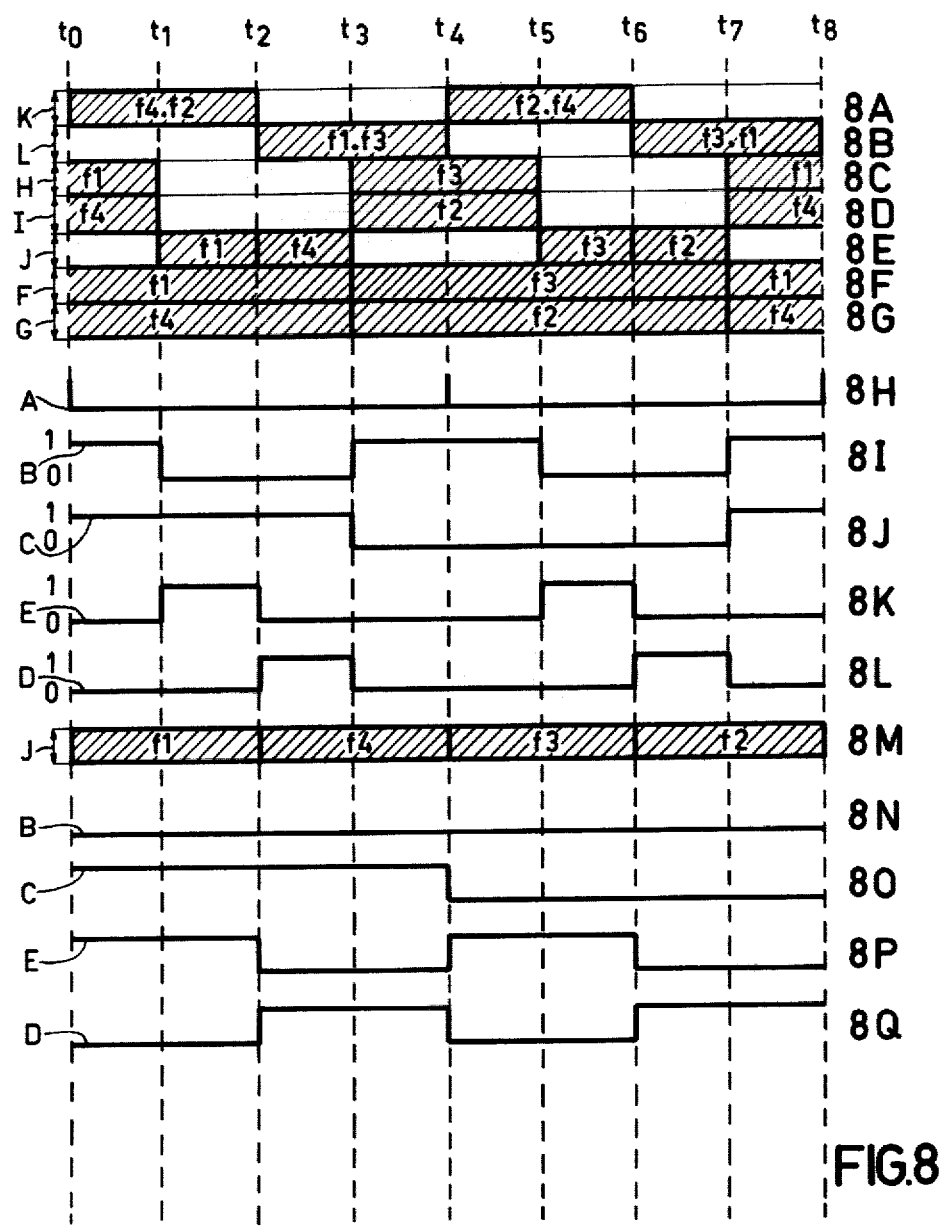

FIG. 8 shows a number of diagrams to explain the operation of the frequency generator 54 in the apparatus of FIG. 7 as a function of the rotation of the head disc 1, two revolutions being represented, after which the process is repeated. The instant $t_o$ corresponds to the situation which is shown schematically in FIG. 5, where the head 2 just begins to scan the track n. FIGS. 8A and 8B respectively give the frequencies of tracking signals in the tracks adjacent the tracks to be followed by the head 2 or 3 respectively. For the head 2 these frequencies are the frequencies $f_2$ and $f_4$ during the 1st and 3rd half revolution and for the head 3 the frequencies $f_1$ and $f_3$ during the 2nd and 4th half revolution. FIGS. 8C and 8D respectively give the frequency of the tracking signal to be written by head 4 via gap 13 or 12 respectively, which frequency for the first quarter of the first revolution and the last quarter of the second revolution is the frequency $f_1$ or $f_4$ respectively and for the last quarter of the first revolution and the first quarter of the second revolution the frequency $f_3$ or $f_2$ respectively. FIG. 8E shows the required frequencies for the mixing signal J, no mixing signal being generated during the periods that the head 4 is active, in order to avoid the influence of cross-talk of the tracking signals to be recorded to the heads 2 and 3. During the second and the third quarter of the first revolution and the second and the third quarter of the second revolution the mixing frequencies $f_1$, $f_4$, $f_3$ and $f_2$ should consequently be produced.

Comparing the signals H, I and J reveals that at any instant only two of the four frequencies need be generated. Between the instants $t_0$ and $t_3$ and the instants $t_7$ and $t_8$ these are the frequencies $f_1$ and $f_4$ and between the instants $t_3$ and $t_7$ the frequencies $f_2$ and $f_3$. Thus, it suffices to use two switchable frequency dividers. The divider 27 is switchable in such a way that it can produce the frequencies $f_1$ and $f_3$ and the divider 28 the frequencies $f_2$ and $f_4$. The basic frequency of the divider 27 or 28 is shown in the time diagram of FIGS. 8F and 8G respectively.

On command of the signal A the program generator 41 generates the signals B, C, D and E. The signals A, B, C, D and E are represented in the time diagram of the FIG. 8H, 8I, 8J, 8K and 8L respectively. The signal A comprises one pulse per revolution of the head disc 1, which in the present example appears at the instants $t_0$, $t_4$ and $t_8$. The signal B is square-wave shaped and has the logic state "0" between the instants $t_1$ and $t_3$ and the instants $t_5$ and $t_7$, i.e. the period that the head 4 does not write on the tape 8. In these periods the output signals of the dividers 27 and 28 and the erase signal from the generator 26 are suppressed by the application of the signal B to the gates 29, 30 and 63 respectively, so that the coils 15 and 16 of the head 4 receive noise signals during these intervals in order to avoid cross-talk when the heads 2 and 3 read tracking signals.

The signal C is square-wave shaped with edges at the instants $t_3$ and $t_7$ and serves to change over the dividers 27 and 28 at the instants $t_3$ and $t_7$.

The signal E has the logic state "1" between the instants $t_5$ and $t_6$ and is supplied to gate 31, so that during these intervals the output signal F of the divider 27 is applied to the mixing stage 49, and the signal T has the logic state "1" between the instants $t_2$ and $t_3$ and between the instants $t_6$ and $t_7$ and is applied to the gate 32, so that between the instants $t_2$ and $t_3$ and between the instants $t_6$ and $t_7$ the output signal of the divider 28 is applied to the mixing stage 49. Thus, the mixing stage receives the frequencies represented in the time diagram of FIG. 8E.

During reproducing the head 4 is not used and tracking is consequently possible during the entire revolution of the head disc 1. The frequencies to be received by the mixing stage 49 are shown in FIG. 8M. The time diagram of FIGS. 8N, 8O, 8P and 8Q represent the signals B, C, E and D during reproduction. The signal B always has the logic state "0", so that the gates 29, 30 and 63 are blocked and the head 4 receives no signals. The logic state of the signal C changes every revolution of the head disc 1. As a result of this the frequencies $f_1$ and $f_4$ are generated in the interval between the instants $t_0$ and $t_4$ and the frequencies $f_2$ and $f_3$ between the instants $t_4$ and $t_8$. The logic state of the signals E and D changes every half revolution, so that the frequency of the signal J applied to the mixing stage 49 is as shown in the diagram of FIG. 8M as a function of time.

The invention is not limited to the embodiment shown. The invention may be used in recorders with one or more recording/reproducing heads and also in recorders in which the tracks are recorded transversely to the longitudinal axis of the tape.

What is claimed is:

1. An apparatus for recording helical scan information and tracking signals on a tape-like record carrier, comprising
   a head disc mounted for rotation in a plane of rotation,
   at least a first write head mounted on said head disc, arranged for sensing a tracking signal on the record carrier transported past the disc, means for detecting the tracking signal on said record carrier sensed by said first write head, and
   means for controlling the height of the first write head which is movably mounted relative to the disc, responsive to said means for detecting,
   characterized in that the apparatus further comprises a fixed write head fixed to the rotary head disc, and
   means for applying further tracking signal to said fixed head while the first write head is detecting said first mentioned tracking signal recorded by the fixed head.

2. An apparatus as claimed in claim 1, characterized in that said means for applying a tracking signal applies an erase signal to said fixed head for erasing information contained on the tape.

3. An apparatus as claimed in claim 1 or 2, comprising in addition a second write head mounted on the rotary head disc, and means for controlling the height of the second write head relative to the disc,
   characterized in that the fixed head has two magnetic circuits, each having a write gap, for simultaneously recording tracking signals in two adjacent tracks.

4. An apparatus as claimed in claim 3, characterized in that the two fixed head gaps, viewed in the direction of rotation of the head disc, are disposed after each other, the trailing gap, viewed in the direction of rotation of head disc, having a width less than that of the leading gap by an amount equal to the track width, the widths of said gaps being at least a plurality of times said track width.

5. An apparatus as claimed in claim 3, characterized in that the fixed write head, viewed in the direction of rotation of the head disc, is disposed substantially half way between the first and second write heads, and
   the apparatus further comprises means for interrupting the height control of the first or second write head as a function of the tracking signals read by the respective write head during a half revolution period in which the fixed head records tracking signals on the tape.

6. A method of recording helical scan information and tracking signals on a tape-like record carrier in form of tracks which are substantially parallel to each other and which make an angle with the longitudinal axis of the record carrier, comprising
   (a) transporting tape along a helical path about a rotary head disc,
   (b) detecting a tracking signal on the tape, and
   (c) controlling the height of a first write head which is movable relative to the disc, in response to said detecting,
   characterized by the additional step of recording said tracking signals by a fixed write head fixed to the rotary head disc, and
   wherein said detecting step comprises reading by the first write head said tracking signals just recorded by the fixed head while the recording process is continuing.

7. A method as claimed in claim 6, wherein said recording step includes applying an erased signal to the fixed write head for erasing information contained on the tape.

8. A method as claimed in claim 7, wherein said recording and erasing steps comprise recording a first tracking signal having a width at least a plurality of times the track width, and then erasing a part of said first tracking signal by recording a second tracking signal over said part.

9. A method as claimed in claim 8, wherein said first and second tracking signals have different frequencies.

* * * * *